United States Patent
Hassan et al.

(10) Patent No.: US 12,289,690 B2
(45) Date of Patent: Apr. 29, 2025

(54) INTERFERENCE REDUCTION FOR WIRELESS COMMUNICATIONS USING INTERFERENCE CANCELLATION AND SELECTIVE POWER CONTROL

(71) Applicant: Microsoft Technology Licensing, LLC, Redmond, WA (US)

(72) Inventors: Amer Aref Hassan, Kirkland, WA (US); Roy D. Kuntz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 513 days.

(21) Appl. No.: 17/836,629

(22) Filed: Jun. 9, 2022

(65) Prior Publication Data

US 2023/0413187 A1     Dec. 21, 2023

(51) Int. Cl.
*H04W 72/08* (2009.01)
*H04W 24/10* (2009.01)
*H04W 52/24* (2009.01)

(52) U.S. Cl.
CPC ................................. *H04W 52/243* (2013.01)

(58) Field of Classification Search
None
See application file for complete search history.

(56) References Cited

U.S. PATENT DOCUMENTS

| | | | |
|---|---|---|---|
| 8,103,302 B2 | 1/2012 | Haartsen et al. | |
| 8,761,080 B2 | 6/2014 | Mese et al. | |
| 9,226,200 B2 * | 12/2015 | Wong | H04W 24/02 |
| 9,420,476 B2 * | 8/2016 | Koutsimanis | H04J 11/005 |
| 9,445,285 B2 * | 9/2016 | Maddah-Ali | H04W 24/02 |
| 9,584,276 B2 * | 2/2017 | Kim | H04L 5/0073 |

(Continued)

FOREIGN PATENT DOCUMENTS

| | | |
|---|---|---|
| CA | 2609761 C | 5/2011 |
| EP | 1139581 B1 | 10/2004 |

(Continued)

OTHER PUBLICATIONS

Goussevskaia, et al., "Scheduling Wireless Links with Successive Interference Cancellation", In Proceedings of the 21st International Conference on Computer Communications and Networks, Jul. 30, 2012, 7 Pages.

(Continued)

*Primary Examiner* — Tuan A Tran
(74) *Attorney, Agent, or Firm* — Schwegman Lundberg & Woessner, P.A.

(57) ABSTRACT

Disclosed in some examples are methods, systems, and machine-readable mediums in which interference is mitigated on a wireless radio frequency channel used by multiple computing devices by adjusting (e.g., lowering) the power level of one or more computing devices (e.g., mobile devices such as User Equipment (UE) devices) and using successive interference cancellation to decode the combined signals. Successive interference cancellation may first decode a strongest signal of a combined signal of all computing devices. The decoded signal is then subtracted from the combined signal. The strongest signal of that combined signal is then decoded and then subtracted and so on until all signals are decoded.

20 Claims, 8 Drawing Sheets

(56) References Cited

U.S. PATENT DOCUMENTS

| | | | |
|---|---|---|---|
| 9,621,316 B2* | 4/2017 | Kim | H04L 5/0035 |
| 9,680,578 B2* | 6/2017 | Hwang | H04L 1/1812 |
| 9,769,835 B2* | 9/2017 | Nordström | H04L 1/0006 |
| 9,781,714 B2* | 10/2017 | Lorca Hernando | H04L 1/22 |
| 9,961,692 B2* | 5/2018 | Nordström | H04J 11/0056 |
| 10,218,487 B2* | 2/2019 | Min | H04W 52/243 |
| 10,250,349 B2* | 4/2019 | Venkatasubramanian | H04B 7/024 |
| 10,256,950 B2* | 4/2019 | Yang | H04J 11/005 |
| 10,278,022 B2* | 4/2019 | Zhou | H04W 74/0816 |
| 10,356,723 B2 | 7/2019 | Noh et al. | |
| RE47,744 E | 11/2019 | Cho et al. | |
| 10,484,210 B2 | 11/2019 | Tavares et al. | |
| 10,615,919 B2* | 4/2020 | Chen | H04L 1/18 |
| 10,708,920 B2* | 7/2020 | Kitazoe | H04W 72/51 |
| 10,797,901 B2* | 10/2020 | Zhang | H04L 12/2801 |
| 10,952,084 B2* | 3/2021 | Damnjanovic | H04W 16/14 |
| 11,012,125 B2* | 5/2021 | Lou | H04L 25/0258 |
| 11,297,627 B2* | 4/2022 | Stathakis | H04L 5/003 |
| 11,553,475 B2* | 1/2023 | Wu | H04W 52/34 |
| 11,588,607 B2* | 2/2023 | Abotabl | H04W 72/23 |
| 2016/0088573 A1 | 3/2016 | Xue et al. | |

FOREIGN PATENT DOCUMENTS

| | | |
|---|---|---|
| EP | 2748995 A1 | 7/2014 |
| EP | 2114040 B1 | 1/2017 |
| EP | 2443756 B1 | 4/2018 |

OTHER PUBLICATIONS

"International Search Report and Written Opinion Issued in PCT Application No. PCT/US23/019029", Mailed Date: Jul. 17, 2023, 13 Pages.

Amaldi, et al., "Planning UMTS Base Station Location: Optimization Models with Power Control and Algorithms", In Journal of IEEE Transactions on Wireless Communications, vol. 2, Issue 5, Sep. 8, 2003, pp. 939-952.

* cited by examiner

INTERFERENCE REDUCTION FOR WIRELESS COMMUNICATIONS USING INTERFERENCE CANCELLATION AND SELECTIVE POWER CONTROL

TECHNICAL FIELD

Embodiments pertain to wireless communications using radio waves. Some embodiments relate to interference reduction in wireless communications. Additional embodiments relate to interference reduction in wireless communications using selective power control along with successive interference cancellation.

BACKGROUND

Wireless communications using Radio Frequency (RE) waves have fundamentally altered our lives. Information may be transmitted from around the world to a device that fits in the palm of a user's hand. Recent advancements in wireless protocols, such as Wi-Fi 6 and Third Generation Partnership Project (3GPP) 5G wireless service provides incredible increases in data transmission capabilities. As these services have improved in both data rate and reliability, the number of users that utilize these services increases. As the number of computing devices using the frequency space have increased, it has created challenges where transmissions may interfere with one another.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In many cases, interference may be controlled by changing the power levels of one or more transmitting computing devices. For example, traditionally, a computing device that is being interfered with will increase their power level to compensate. This increase in transmission power, while making the computing device's signal clearer at the receiver, may cause interference with signals from other computing devices. These other computing devices may then attempt to increase their power levels which causes additional interference. This continued increasing of transmission power only temporarily solves the interference and leads to increased power usage at these devices.

Recent advancements in data processing for communications such as faster processing capability and increased memory on the mobile device and network-based software defined radio systems (e.g., where the processing of the signal is done on a server) have made the use of advanced signal processing algorithms with real-time voice and video communications feasible. One example such technique is successive interference cancellation. However, successive interference cancellation performs best when the received power levels of the signals that are decoded are not close together. Computing devices utilizing conventional power control techniques may operate as described above by serially increasing their power. This may result in received power levels that are too close to each other for effective use of successive interference cancellation.

Disclosed in some examples are methods, systems, and machine-readable mediums in which interference is mitigated on a wireless radio frequency channel used by multiple computing devices by adjusting (e.g., lowering) the power level of one or more of the computing devices (e.g., mobile devices such as User Equipment (LSE) devices) and using successive interference cancellation to decode the combined signals. For example, a device that is being interference with may lower their power level (rather than raising it) to allow for the successful decoding of their signal using successive interference cancellation. Successive interference cancellation may first decode a strongest signal of a combined signal of all computing devices. The decoded signal is then subtracted from the combined signal. The strongest signal of that combined signal is then decoded and then subtracted and so on until all signals are decoded.

The disclosed techniques solve the technical problem of wireless interference by the technical solution of utilizing advanced signal processing algorithms in conjunction with un-intuitive transmission power adjustments (e.g., lowering power levels) responsive to detected interference. This technical solution improves spectrum efficiency by allowing additional computing devices to use a particular wireless frequency range and decreases interference for existing devices. This technique also reduces power consumption by allowing for lower transmission power levels, thus increasing battery life, decreasing energy usage, and improving efficiency. In addition, the selective use of interference cancellation only when interference is detected may mitigate the computational cost of these advanced algorithms.

In some examples, successive interference cancellation may be optional for devices. A first computing device that supports successive interference cancellation may wirelessly transmit one or more indications that the computing device has the capability to do successive interference cancellation to other computing devices. In other examples, successive interference cancellation may be required by a standard or protocol used by the computing devices and thus there may be no need for sending an indication.

In some examples, when supported, the computing device may always use successive interference cancellation. In these examples, other computing devices may be aware of this continuous usage of successive interference cancellation and may lower their power levels in response to detected interference without the use of explicit signaling messages. In other examples, the computing device may only use successive interference cancellation when interference is detected or when requested by another computing device. The request to use successive interference cancellation may be explicitly signaled using a wireless message. For example, a first computing device may detect interference to signals sent by a second computing device. If the first computing device supports successive interference cancellation, the first computing device may enable the successive interference cancellation and send a notification to the second computing device that it is using successive interference cancellation to lower a power level of its transmissions. In other examples, the second computing device may detect the interference and request the use of successive interference cancellation from the first computing device. Once the first computing device confirms it is using successive interference cancellation the second computing device may lower its transmission power.

In other examples, successive interference cancellation may be enabled without signaling. For example, a first computing device may engage successive interference cancellation by detecting that one or more signals from a second computing device have been interfered with. The second computing device may also detect the interference (e.g., by its own measurements or observations of the wireless channel or from a message from the first computing device indicating interference) and the second computing device may then act to lower its power level. These actions may happen without explicit signaling to enable or request the enablement of the successive interference cancellation and/or without explicit signaling to request a power level reduction.

In some examples, a first computing device utilizing successive interference cancellation for signals received from a plurality of second computing devices may manage power levels of the plurality of second computing devices. The first computing device may command one or more second computing devices to lower their power levels in response to interference. In other examples, the first computing device may command the plurality of other computing devices to raise or lower their power levels to ensure that received power levels at the first computing device of signals from the plurality of second computing devices are distributed to increase the effectiveness of the successive interference cancellation. These power control messages may be sent wirelessly over the wireless channel.

The transmission power level of one or more devices may be lowered relative to a previous transmission or relative to the power level that the protocol with which they are transmitting (e.g., 4G, 5G, Wi-Fi) specifies for the channel conditions and other factors. The first computing device then utilizes successive interference cancellation to decode one or more signals from one or more other computing devices.

Example computing devices as described herein include User Equipment (UE) devices, base stations, STA devices, AP devices, and the like. These devices may be in the form of a mobile device such as a smartphone, mobile phone, tablet, laptop, or the like. Other example computing devices include desktop computing devices, servers, and the like. The present techniques may be applied to uplink signals from a first computing device to a second computing device or downlink signals from the second computing device to the first computing device. The present techniques may be applied to cellular 3G, 4G, 5G, 6G), Wi-Fi, RFID, Bluetooth, Satellite, and other communication protocols.

Interference may be determined by any of a group of communicating computing devices based upon one or more channel measurements and/or observations. For example, a first computing device may detect interference by being unable to decode one or more signals sent by a second computing device, a packet error rate or bit error rate exceeding a threshold, or the like. The first computing device may then notify the second computing device. This notification may be explicit (a special message) or implicit—e.g., the second computing device may detect interference based upon identifying a number of retransmission requests from the first computing device that exceeds a specified threshold number over a specified time period. In the latter examples, the specified time period may be determined based upon other channel metrics, such as a received signal power from transmissions from the other computing device. This may rule out other causes of packet loss and retransmission requests such as when the computing devices are nearing their effective communication range In some examples, one or more devices may directly sample the signal to calculate a signal to noise ratio. A signal to noise ratio below a specified threshold may indicate interference.

Figure 1:
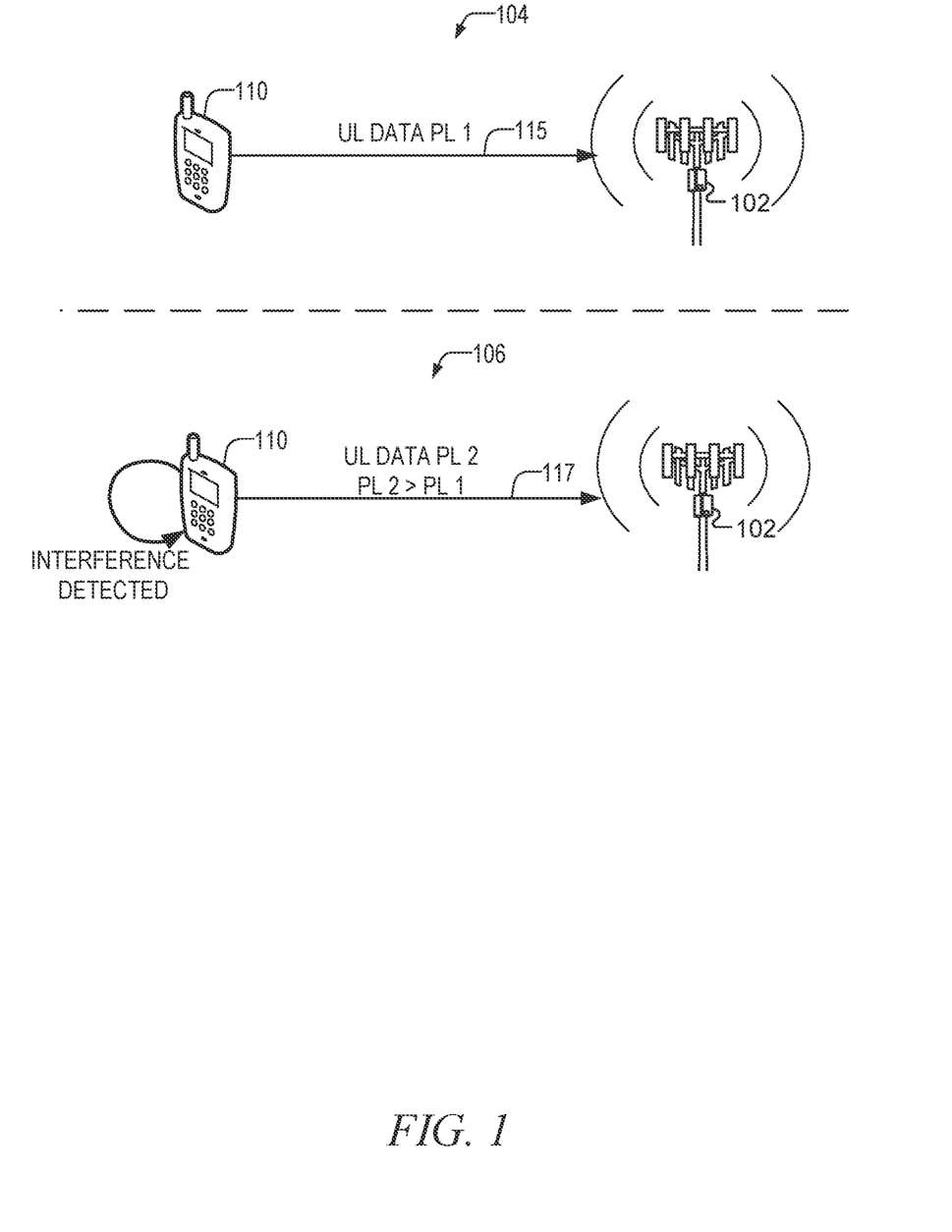
FIG. 1 illustrates a diagram of a transmission between a first computing device 110 and a second computing device in the form of a base station 102 according to some examples of the present disclosure.

FIG. 1 illustrates a diagram of a transmission between a first computing device 110 and a second computing device in the form of a base station 102 according to some examples of the present disclosure. At time 104, the first computing device 110 may transmit uplink data 115 to the base station 102 at power level (PL) 1. At time 106, the first computing device 110 may detect interference. In response, traditional power level algorithms may cause computing device to transmit uplink data 117 at PL 2—where PL2 is greater than PL 1.

Figure 2:
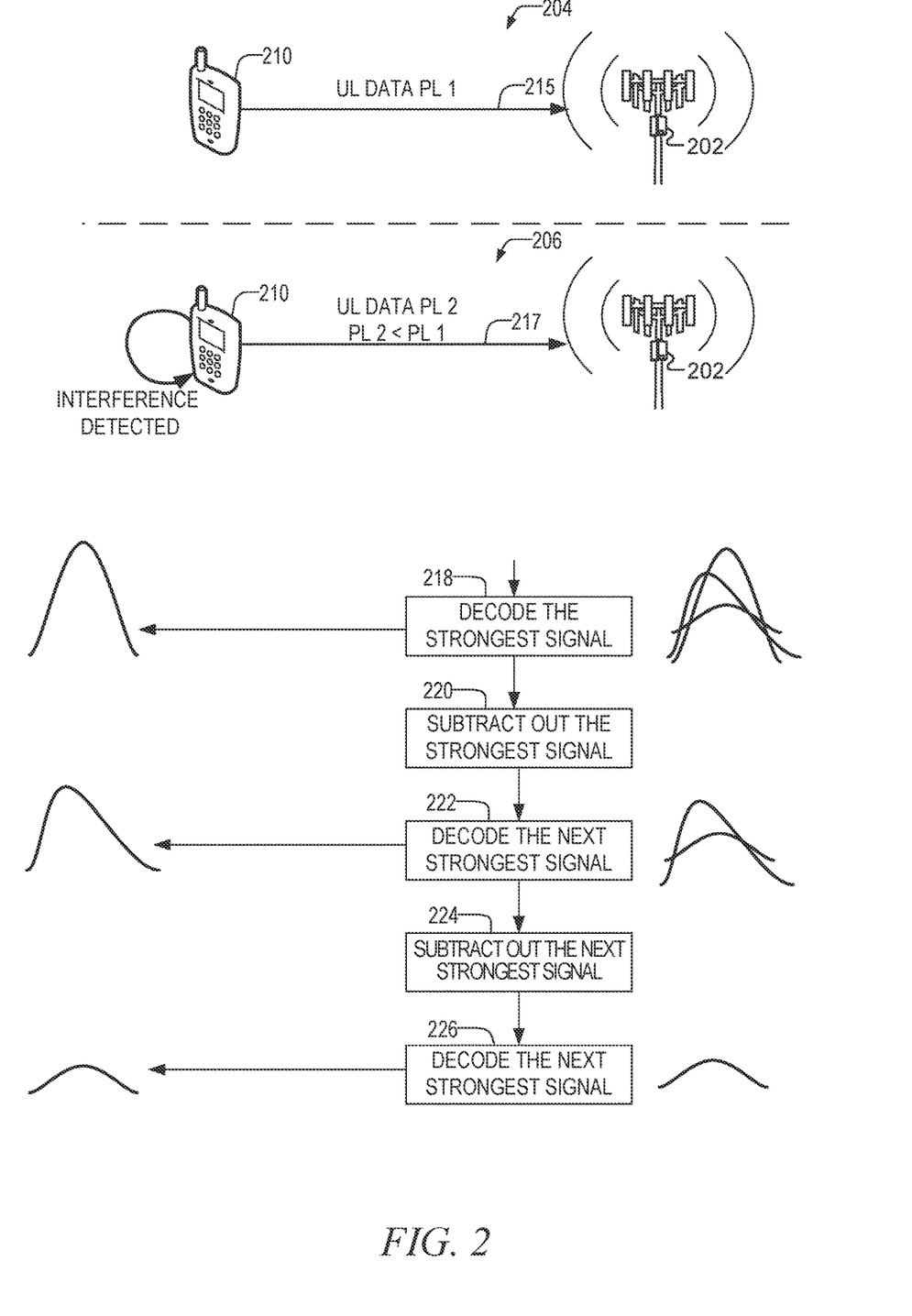
FIG. 2 illustrates a diagram of an improved transmission between a first computing device and a second computing device in the form of a base station according to some examples of the present disclosure.

FIG. 2 illustrates a diagram of an improved transmission between a first computing device 210 and a second computing device in the form of a base station 202 according to some examples of the present disclosure. At time 204, the first computing device 210 transmits uplink data 215 at PL 1. At time 206, the first computing device 210, or the base station 202 detects interference to this uplink data. In response, the first computing device 210 transmits uplink data 217 at where PL2; where is lower than PL1. The base station 202 may then utilize successive interference cancellation to decode the signals of first computing device 210 and one or more other computing devices (the other computing devices are not shown for clarity).

In some examples, the base station 202 may always use successive interference cancellation and so no signaling is needed between the first computing device 210 and the base station 202 to enable this feature and the first computing device 210 may lower the power level of its uplink data 217 by itself. This may be required in a protocol used to communicate between the base station 202 and the first computing device 210 or may be signaled using a message sent from the base station 202 to the first computing device 210 (such as a broadcast message).

In other examples, the base station 202 may only use successive interference cancellation when interference is detected. For example, base station 202 may control the power level of first computing device 210. Base station 202 may detect interference with signals from the computing device 210, turn on successive interference cancellation, and signal the computing device 210 to lower its power level. In other examples, the first computing device 210 may detect interference, determine that the base station 202 supports successive interference cancellation, and request (via a wireless message) that the base station 202 begin using successive interference cancellation. Upon receiving a confirmation that the base station 202 has begun using successive interference cancellation, the first computing device 210 may lower a power level of the uplink data 217.

As noted, the base station may utilize successive interference cancellation which may decode a strongest signal, subtract that signal from the combined signal, decode a next strongest signal, and so on. For example, a combined signal of three computing devices may be received. At operation 218, the base station 202 may decode the strongest signal. The decoded signal may then be processed as normal. The strongest signal may then be subtracted out from the combined signal at operation 220. At operation 222, the next strongest signal may be decoded and then at operation 224 the next strongest signal may be subtracted from the combined signal and then at operation 226 the final signal may be decoded.

Figure 3:
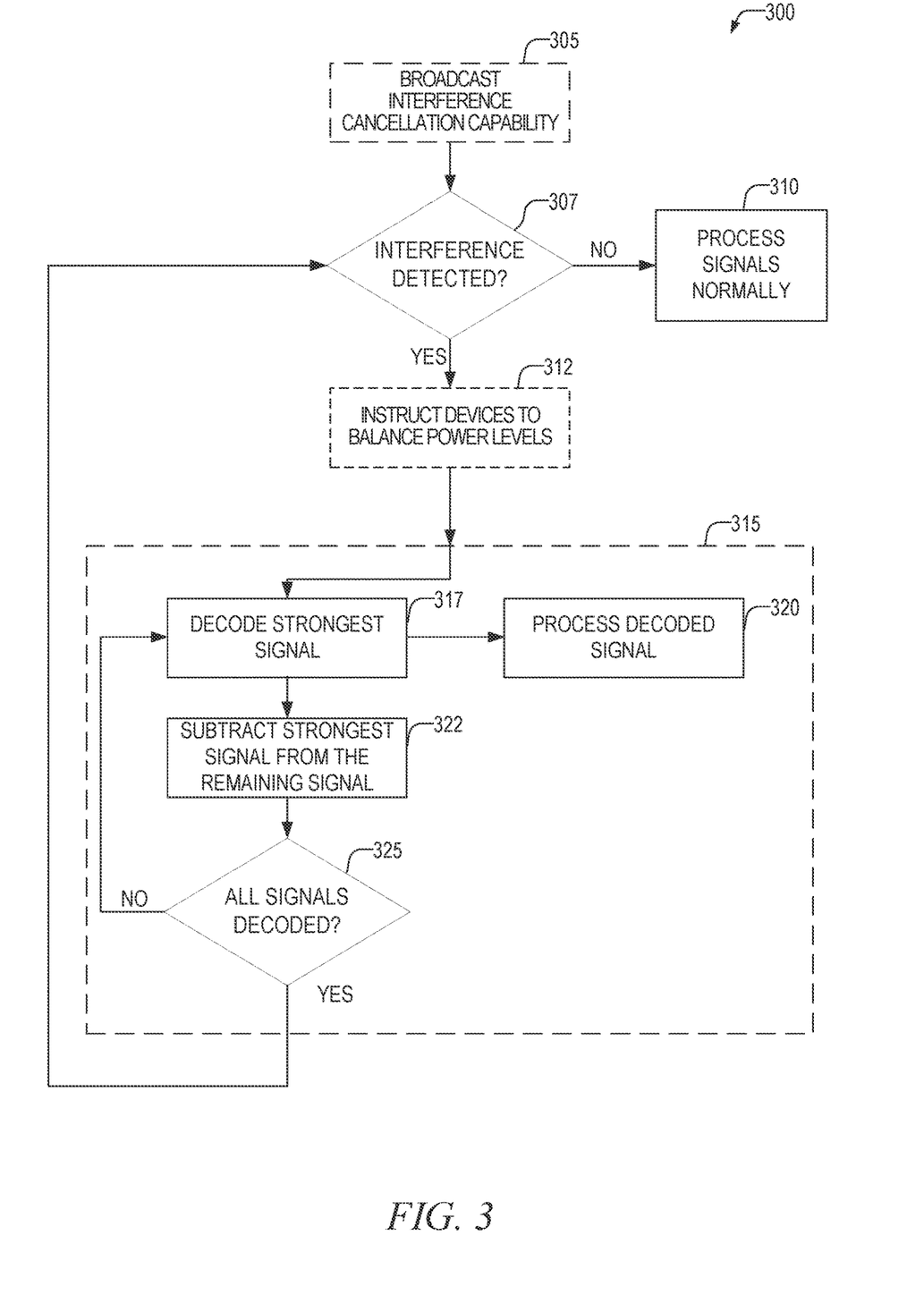
FIG. 3 illustrates a flowchart of a method of a first computing device handling wireless interference according to some examples of the present disclosure.

FIG. 3 illustrates a flowchart of a method 300 of a first computing device handling wireless interference according to some examples of the present disclosure. At operation 305, the first computing device may optionally broadcast an interference cancellation capability to one or more second computing devices. For example, as part of a broadcast control channel, a system information message, a beacon message, a P2P message, a special broadcast that advertises only the interference cancellation capability, or the like. The interference cancellation capability may be indicated as a field of a message that may advertise other capabilities of the first computing device.

At operation 307, the first computing device may identify channel conditions and make a determination as to whether interference is detected for one or more second computing devices. For example, the first computing device may not be able to decode a received signal from a second computing device. In other examples, interference may be detected based upon one or more messages from one or more second computing devices. These second computing devices may infer the interference using retransmission requests, channel measurements, or the like.

If interference is not detected, then at operation 310, the first computing device may process signals as normal. If interference is detected, then in some examples, the first computing device may notify the second computing device that interference is detected and to lower or otherwise adjust their transmission power at operation 312. The message at operation 312 may be a power level adjustment message, a notification that the computing device is using successive interference cancellation (and thus the device may lower its power in response to interference) or the like. In some examples, at operation 312 the receiver may instruct multiple computing devices sending signals to the first computing device to balance their power levels such that the received power levels of the signals sent by each of the other computing devices arrive with a range of different power levels at the first computing device. For example, the power levels as received are spaced out by a prespecified range of dBM. In other examples, the other computing devices may lower the power as they detect interference themselves without explicit signaling.

In addition, at operation 315, the receiver may apply a successive interference cancellation to subsequent received signals as indicated by operations 317, 320, 322, and 325. At operation 317, a strongest signal is decoded. At operation 320, the decoded signal is processed. At operation 322, the strongest signal is subtracted from the combined signal. At operation 325 it is determined if there are any remaining signals to decode. This determination may be based upon comparing the number of decoded signals to the number of expected signals. In other examples, the receiver may determine whether other signals exist that are above the noise floor. If all signals are decoded at operation 325, the system continues receiving additional transmissions and checking for interference at operation 307 (which may include performing operations 310, 312, and 315) for a new time period. If all signals are not decoded, then operations 317, 320, and 322 may be repeated for the next strongest signal until all signals are decoded.

While FIG. 3 illustrated a scenario of selective use of successive interference cancellation, in some examples, the first computing device would utilize the successive interference cancellation operations 315 regardless of the presence of any interference. In these examples, the other computing devices communicating with the first computing device may spontaneously, and without prior permission or messaging lower their power levels if they detect interference. In these examples, a message such as the broadcast message at operation 305 may not be sent—for example if the wireless protocol used to communicate requires the use of successive interference cancellation.

Figure 4:
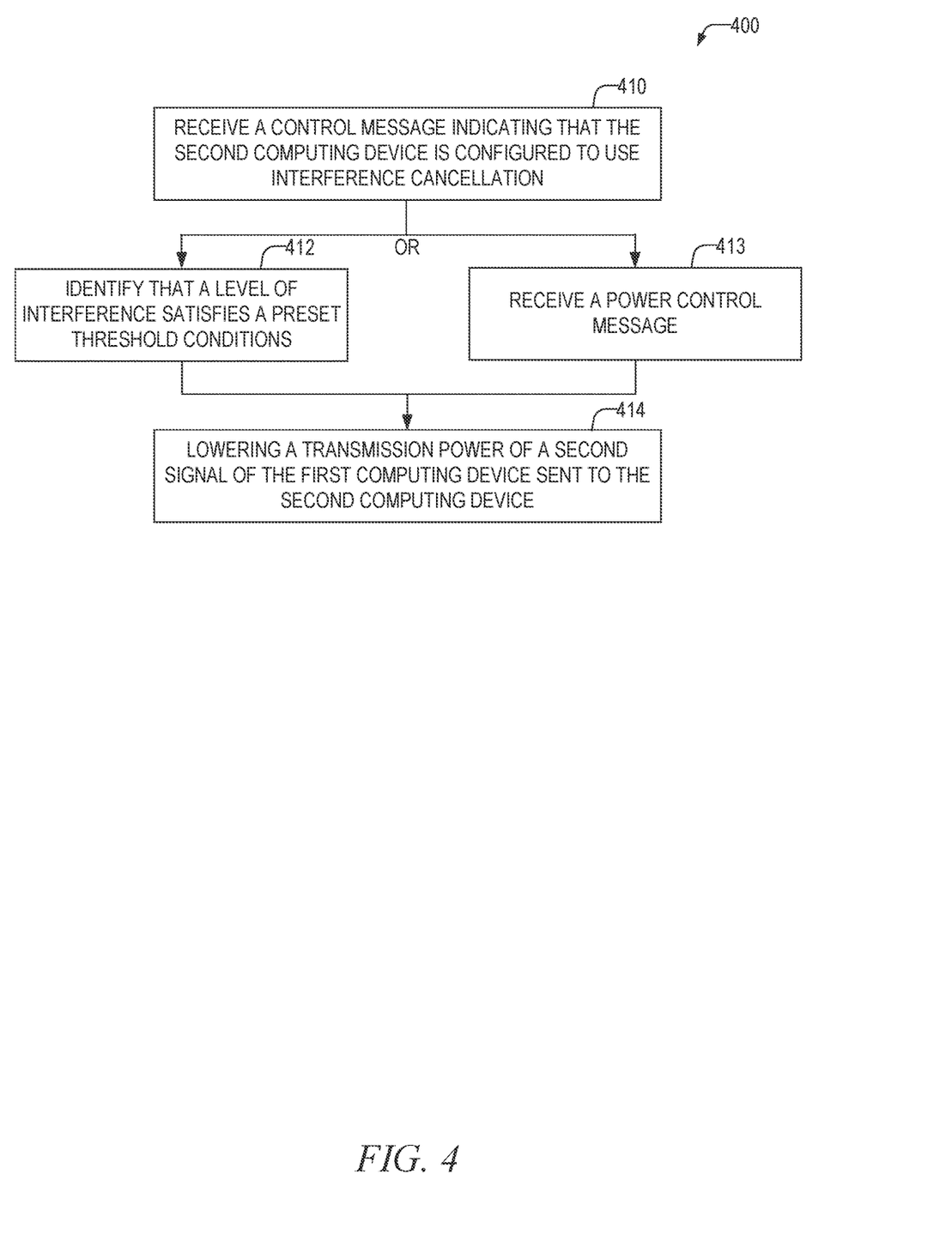
FIG. 4 illustrates a flowchart of a method of a first computing device performing a power reduction responsive to detecting interference according to some examples of the present disclosure.

FIG. 4 illustrates a flowchart of a method 400 of a first computing device performing a power reduction responsive to detecting interference according to some examples of the present disclosure. FIG. 3 illustrated the receiver's use of successive interference cancellation and FIG. 4 illustrates the sender's use of power level reduction. At operation 410 the first computing device may receive a control message indicating that the second computing device is configured to use interference cancellation according to some examples of the present disclosure. For example, the control message may be part of a broadcast control channel, a beacon frame, a system information message, or the like. In some examples, instead of receiving an indication on a control message, the first computing device may receive another message, such as a field identifying this capability in data or other messages. In yet other examples, operation 410 may not be done. For example, a wireless protocol used to communicate with the second computing device may dictate that the second computing device supports successive interference cancellation techniques and so the capability may be assumed.

In some examples, at operation 412, the first computing device may identify that a level of interference satisfies a preset threshold condition. For example, the first computing device may detect the interference from one or more conditions of a radio frequency channel between the first and second computing devices. In other examples, the first computing device may receive a message from the second computing device that packets (e.g., a threshold number of packets) are not being successfully decoded at the second computing device or the interference is otherwise detected. In still other examples, the interference may be inferred based upon packet loss as described previously.

In other examples, instead of identifying that the level of interference satisfies a preset threshold condition at operation 412, the first computing device may receive a power control message from another computing device at operation 413 when the other computing device detects interference with a signal of the first computing device.

At operation 414, responsive to detecting the level of interference and ascertaining that the second computing device is capable of successive interference cancellation; OR responsive to being commanded to lower a power level (e.g., in response to the second computing device detecting interference), the first computing device may lower a transmission power of a subsequent signal sent to the second computing device. The transmission power may be lowered relative to one or more signals sent previously that resulted in the interference detected at operation 412; lowered relative to a wireless protocol specified power level; or the like.

In some examples, and not shown for clarity, in response to identifying that the level of interference satisfies a preset threshold condition at operation 412, the first computing device may send a request to the second computing device to activate a successive interference cancellation capability.

Figure 5:
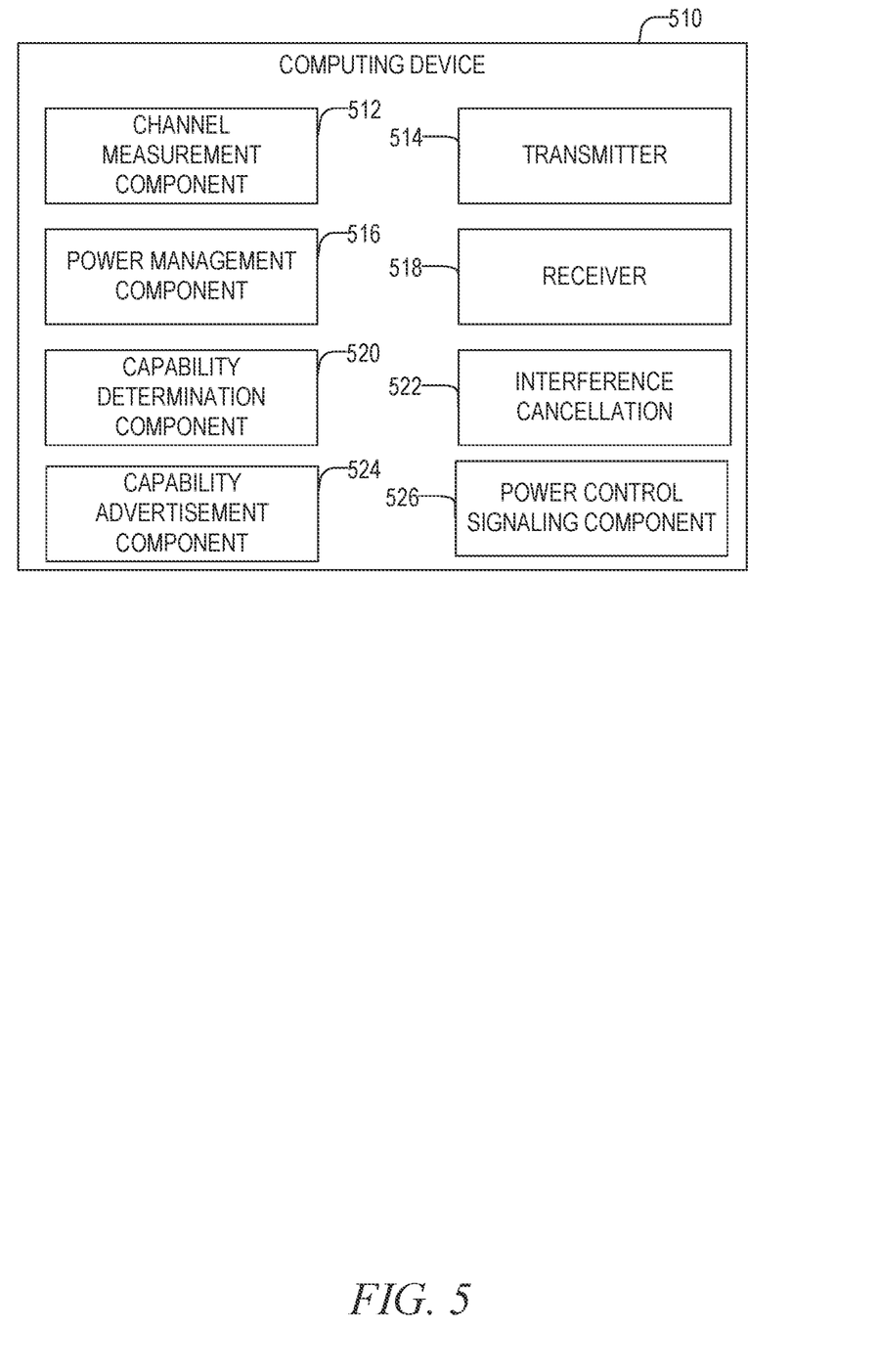
FIG. 5 illustrates a logical diagram of a computing device according to some examples of the present disclosure.

FIG. 5 illustrates a logical diagram of a computing device 510 according to some examples of the present disclosure. In some examples, computing device 510 may be in the form of a base station, such as base stations 102, 202 and 702, and may be examples of computing devices 110, 210, 610, 620, 615, 710, 712, 714, 835, 840, and 845. Computing device 510 may include a transmitter 514 and receiver 518 that transmits and receives wireless radio frequency signals Transmitter 514 and receiver 518 may be combined as a transceiver. Channel measurement component 512 may measure interference, received power levels from signals received from another computing device, channel quality, or the like. Channel measurement component 512 may determine if there is interference on one or more communication channels, such as those used to transmit to another computing device or to a base station. Capability determination component 520 may determine the capabilities of a communicating partner device such as another computing device. For example, capability determination component may decode and interpret a control channel broadcast, a beacon frame, a SSID broadcast, or the like. For example, capability determination component 520 may determine that the communicating partner device supports interference cancellation.

Power management component 516 may control a power of the transmitter 514. The power may be determined using one or more formulas specified by the wireless protocol that is being used by the transmitter. The formulas may use channel measurements taken by the channel measurement component 512 to determine a power level for the transmitter 514. In some examples, in response to the channel measurement component 512 determining that the channel is suffering from interference or from a message from another computing device that interference is occurring, the power management component 516 may lower a power level of the transmitter for a next transmission below a normal power level. In some examples, if the transmission is sent to a computing device that does not support successive interference cancellation, the power level may be raised. The normal power level may be a power level lower than the previous transmission (e.g., at transmission interval T1, the power level is higher than at the next transmission interval T2), or a power level lower than that specified by the wireless protocol given the channel measurements taken by the channel measurement component 512; or a power level specified by the communicating partner device. Power management component 516 may also raise or lower the transmission power of the transmitter 514 in response to power control signals from a second computing device.

As noted, the techniques of the present disclosure may be used in a variety of environments, and in some examples, it may be used in peer-to-peer wireless environments as well as more centralized environments like cellular systems. In examples where the computing device 510 receives signals that have a reduced power level in response to interference from another computing device, the computing device 510 may include an interference cancellation component 522. This may use successive interference cancellation operations 315, such as described in FIG. 3.

In addition, the computing device 510 may also include a capability advertisement component 524 to send the capability of the device to the computing device's communication partner(s). In examples in which the computing device 510 includes the successive interference cancellation component 522, the capability advertisement component 524 may advertise the capability to do the successive interference cancellation to a communication partner. These capability messages may use P2P messaging, a broadcast message (such as on a broadcast control channel), or the like.

Power control signaling component 526 may, in some examples, control power of one or more of the communication partner devices. For example, by sending power adjustment commands to these devices. In interference situations, and where interference cancellation is used, the power control signaling component may signal one or more computing devices to lower their transmission power. In some examples, the power control signaling component may instruct the other computing devices that the computing device 510 is communicating with such that the received power of each device is spaced out to improve the successive interference cancellation component 522. For example, the successive interference cancellation may work best with received power levels that are 3 dB apart and in some examples, not less than 2 dB apart. This is because where two computing devices have similar received power levels, the interference cancellation is not as effective. The power control signaling component 526 may calculate power corrections by instructing a computing device whose received power is close to another computing device to either raise or lower their power levels. The determination of whether to raise or lower the power levels may involve whether a third computing device has a received power level below or above the two computing devices whose power levels are close to each other. In some examples, more than one power level may be adjusted to space out the received power levels of the signals.

Figure 6:
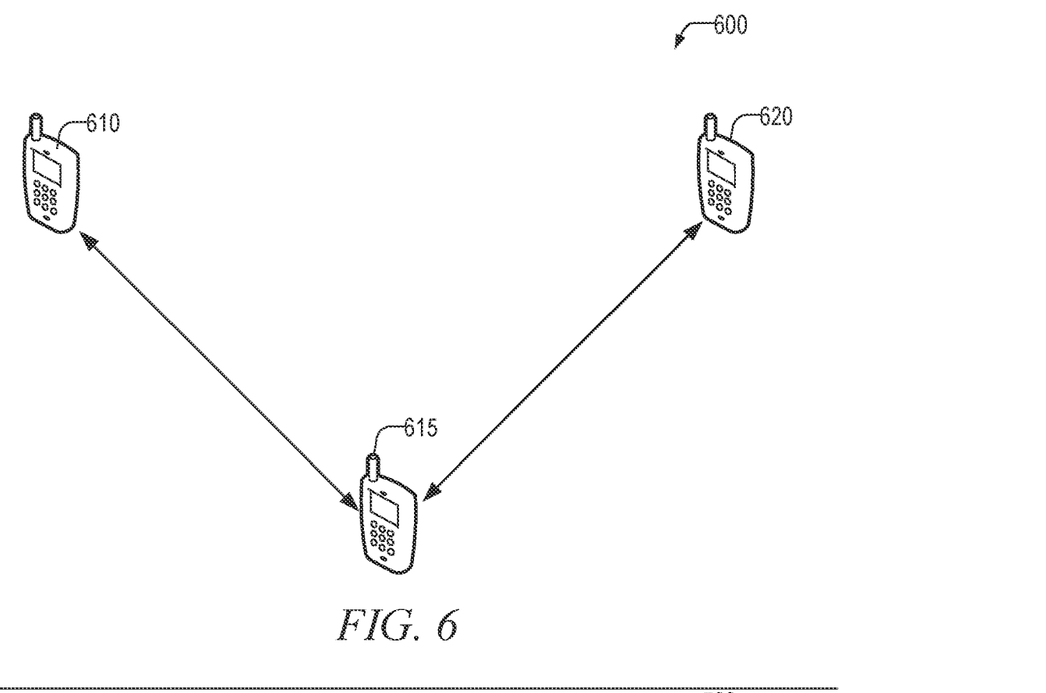
FIG. 6 illustrates a mesh network scenario in which devices communicate in a P2P manner according to some examples of the present disclosure.
Figure 7:
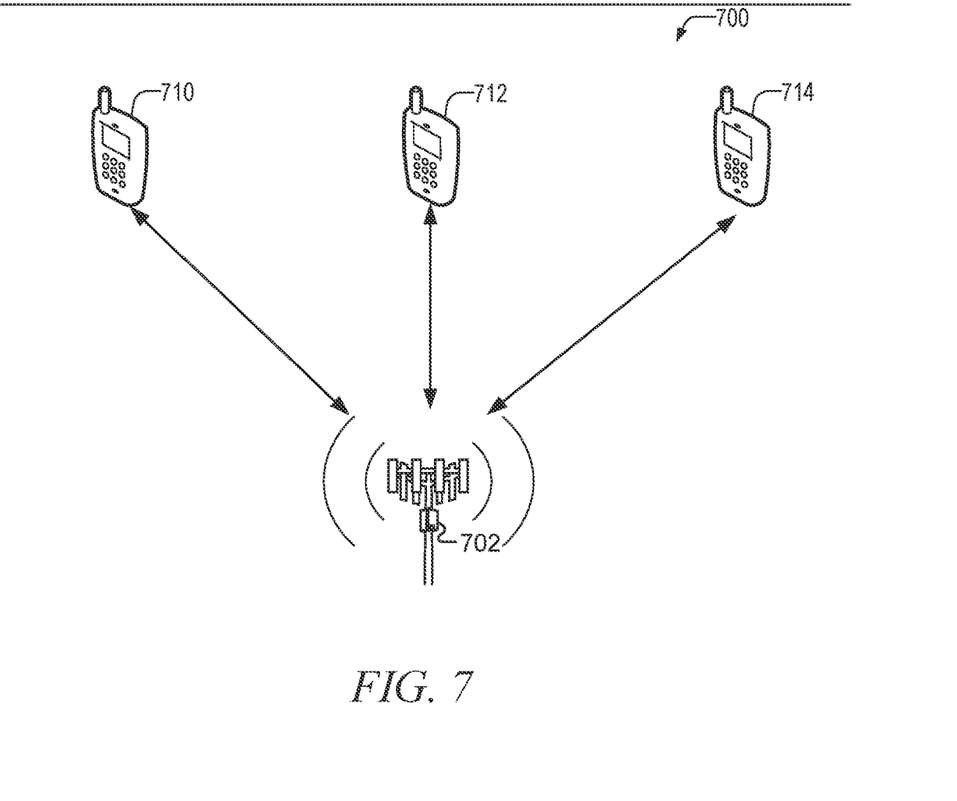
FIG. 7 illustrates a cellular network scenario with computing devices all having wireless links individually to the computing device serving as a base station according to some examples of the present disclosure.
Figure 8:
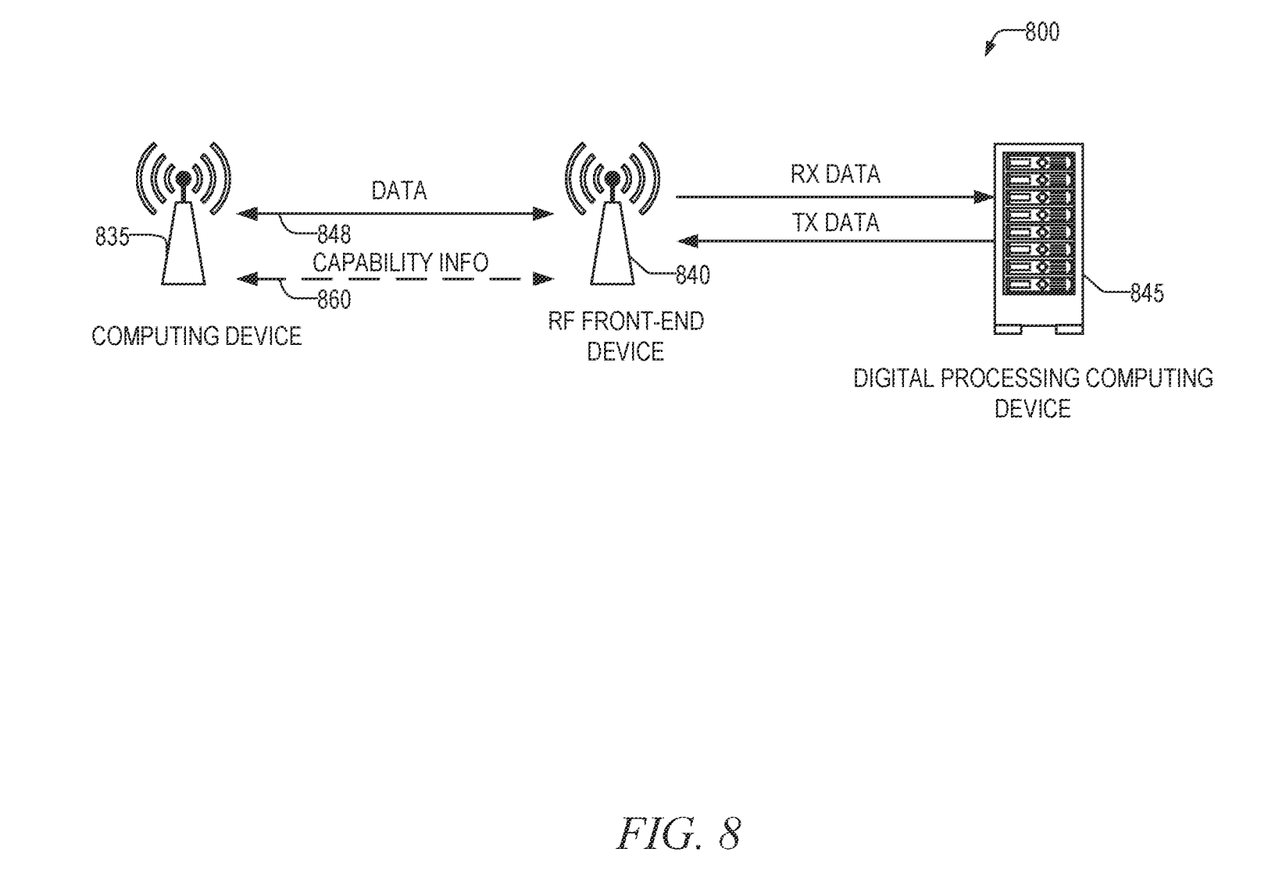
FIG. 8 illustrates a scenario of an interference cancellation for a network-based software-defined-radio according to some examples of the present disclosure.

FIGS. 6-8 illustrate schematic diagrams of various additional environments in which the present disclosure may be utilized. FIG. 6 illustrates a mesh network scenario 600 in which devices communicate in a P2P manner. Computing devices 610, 615, and 620 may be example implementations of computing device 510. Each computing device may manage one or more wireless connections to one or more other computing devices. In some examples, the computing devices 610, 615, and 620 may implement one or more interference cancellation techniques discussed herein. For example, computing device 610 may detect that its transmissions to the computing device 615 are being interfered with. The interference may be from signals transmitted from computing device 620, natural phenomenon, or the like. In response to the interference, and in response to the computing device 610 knowing that the computing device 615 supports successive interference cancellation, the computing device 610 may lower its power. Computing device 615 may inform computing device 610 of its ability to apply successive interference cancellation and may thus apply successive interference calculation in the face of the detected interference. In other examples, the computing device 615 may detect the interference and command one or both of computing devices 610 and 620 to adjust their power level to optimize the interference cancellation. In some examples, the computing devices 610 and 615 may exchange one or more messages to enable the use of successive interference cancellation.

FIG. 7 illustrates a cellular network scenario 700 with computing devices 710, 712, and 714 all having wireless links individually to the computing device serving as a base station 702. In some examples, the base station may detect the interference and instruct one or more of the computing devices 710, 712, and 714 to adjust their power levels (e.g., such as lowering the power levels). In other examples, the base station 702 may advertise that the base station can do interference cancellation. In these examples, one of the computing devices 710, 712, and 714 may lower their power levels without an instruction from the base station 702 in response to the interference.

While in the cellular usage scenario the present disclosure has discussed lowering an uplink power (e.g., a radio link from the computing device to the cellular equipment such as the base station 702), in other examples, the power level of one or more downlink signals from the base station 702 may be adjusted to allow the computing devices 710, 712, and 714 to perform successive interference cancellation. For example, to allow the computing device 710 to decode the signals of the base station 702 in the presence of other interference.

FIG. 8 illustrates a scenario 800 of an interference cancellation for a network-based software-defined-radio according to some examples of the present disclosure. In the example of FIG. 8, a computing device 835, such as a base station, may send and receive data to a radio frequency (RF) front end device 840. In some examples, the RF front end device 840 may include RF reception hardware, an analog to digital converter for converting the received RF signals and packetizing it in digital form for transmission across a packet-based network. RF front end device 840 may also include a digital to analog converter to convert received packetized digital data to analog data for transmission to the computing device 835. The data 848 received from the computing device 835 and converted from analog to digital is transmitted over a network to a digital processing computing device 845 which may decode the signal and process it.

The digital processing computing device 845 may be located remotely from the RF front end device 840 and may be communicatively coupled to it through one or more networks (e.g., a packet-based network such as the Internet). In some examples, the digital processing computing device 845 may have successive interference cancellation capabilities. In these examples, the computing device 835, either on its own volition in response to detecting interference and with knowledge that the digital processing computing device 845 can perform the successive interference cancellation, may lower a transmission power level. In other examples, the computing device 835 may be commanded to lower its power based upon the RF front end device 840 or digital processing computing device 845 commanding the computing device 835 to lower its power level. In some examples, one or more capability messages 860 may be exchanged indicating that either the computing device 835 or the digital processing computing device 845 supports successive interference cancelation.

As described herein, one device may lower their transmission power based upon the knowledge that the other device is using successive interference cancellation. In some examples, this may be known due to the design of the system. For example, one device may always be using successive interference cancellation. For example, the wireless communication may be done over a wireless protocol that specifies that one or more devices use successive interference cancellation. In these examples a first computing device that is communicating with a second computing device that supports successive interference cancellation may lower its power levels when detecting interference. The detected interference may be detected by the first computing device, or may be detected by the second computing device and signaled to the first computing device.

In other examples, the successive interference cancellation may be optional. As described herein, a broadcast or capability message may indicate whether the feature is available at a particular computing device. In some examples in which the successive interference capability is selective, a first computing device experiencing interference may request that a second computing device receiving the signal from the first computing device enable successive interference cancellation using a request message. In other examples, the first and second computing devices detect the interference and both simultaneously act to correct the interference—for example, by enabling the successive interference cancellation AND lowering a power level. Since interference cancellation may be very computationally expensive, and thus utilize significant power resources, in some examples, the use of interference cancellation may be selective in response to detected interference.

Figure 9:
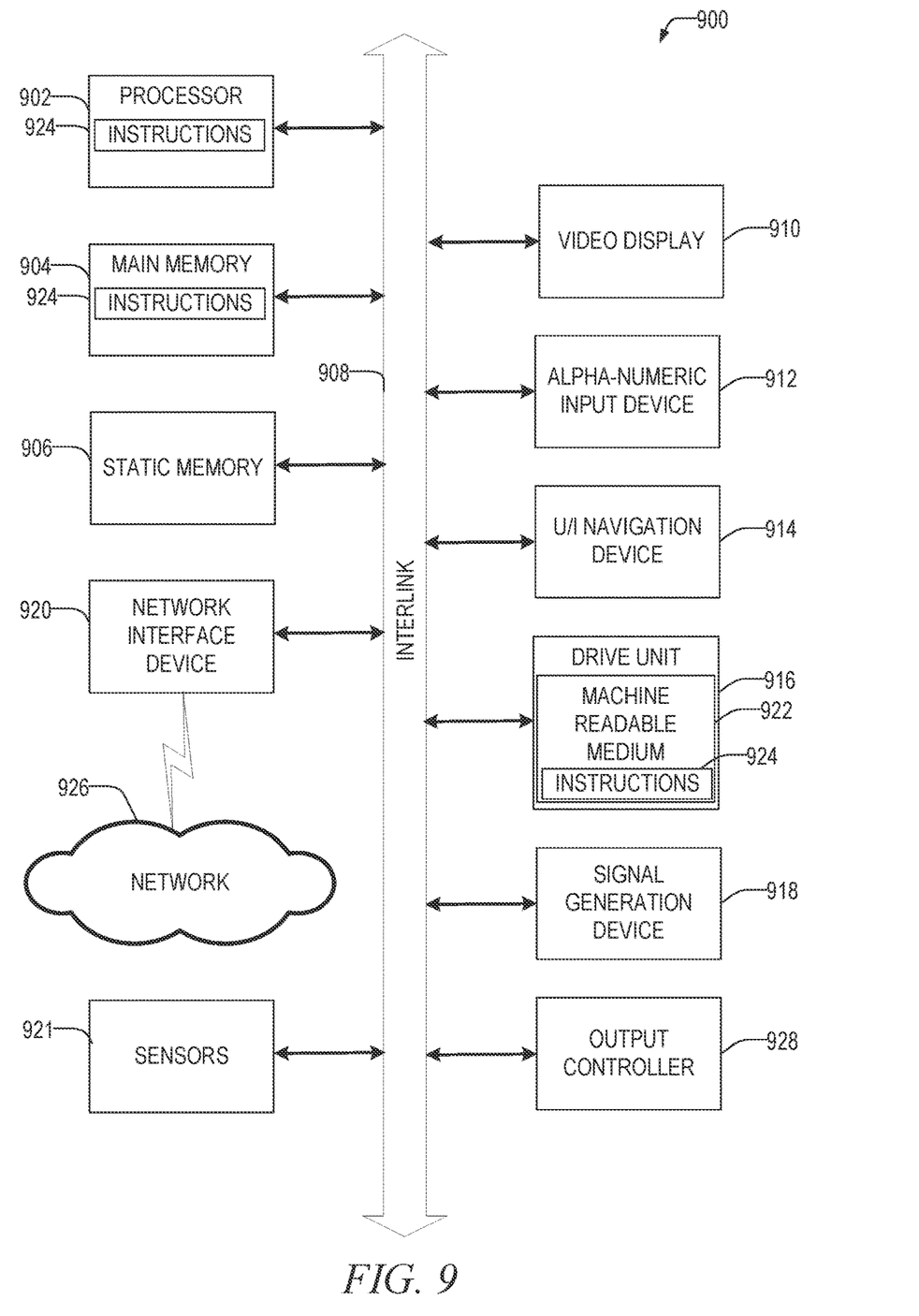
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may be performed. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be in the form of a base station (such as a eNodeB, NodeB, or the like), a computing device, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. In some examples, the machine 900 may implement the computing devices 110, 210, 510, 610, 615, 620, 710, 712, 714, 835, 840, 845; base stations 102, 202; and implement the methods shown in FIGS. 3-4.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 900 may include one or more hardware processors, such as processor 902. Processor 902 may be a central processing unit (CPU), a graphics processing unit (GPU), a hardware processor core, or any combination thereof. Machine 900 may include a main memory 904 and a static memory 906, some or all of which may communicate with each other via an interlink (e.g., bus) 908. Examples of main memory 904 may include Synchronous Dynamic Random-Access Memory (SDRAM), such as Double Data Rate memory, such as DDR4 or DDR5. Interlink 908 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (MEV), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920. The Machine 900 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

OTHER NOTES AND EXAMPLES

Example 1 is a method for wireless communication between a computing device and a second computing device, the method comprising: at the computing device:

receiving a control message with a field indicating that the second computing device is configured to decode a received signal using interference cancellation; identifying that a level of interference on a wireless channel used by the computing device and the second computing device satisfies a preset threshold condition of interference; and responsive to identifying that the level of interference of the wireless channel satisfies the preset threshold condition of interference and based upon receiving the control message with the field indicating that the second computing device is capable of interference cancellation: lowering a transmission power level of a second signal of the computing device sent, to the second computing device, the transmission power level lowered from a transmission power level for sending the second signal had the level of interference of the wireless channel not satisfied the preset threshold condition of interference.

In Example 2, the subject matter of Example 1 includes, at the second computing device: performing successive interference cancellation to subtract out a third signal of a third computing device prior to decoding the second signal.

In Example 3, the subject matter of Examples 1-2 includes, wherein identifying that the level of interference on the wireless channel satisfies the preset threshold condition of interference comprises utilizing a bit-error rate of packets received by the second computing device.

In Example 4, the subject matter of Examples 1-3 includes, receiving a message commanding the computing device to lower power; and wherein lowering the transmission power level is responsive to identifying that the level of interference on the wireless channel satisfies the preset threshold condition of interference, receiving the control message with the field indicating that the receiver is capable of interference cancellation, and receiving the message commanding the receiver to lower power.

In Example 5, the subject matter of Examples 1-4 includes, receiving an adjustment to the transmission power level from the second computing device; and adjusting the transmission power level as indicated by the second computing device.

In Example 6, the subject matter of Examples 1-5 includes, identifying that the level of interference on the wireless channel no longer satisfies the preset threshold condition of interference and in response, adjusting the transmission power level according to a wireless standard used to transmit to the second computing device.

In Example 7, the subject matter of Examples 1-6 includes, wherein lowering the transmission power level comprises lowering the transmission power level below a transmission power specified according to a wireless standard used to transmit to the second computing device for current channel conditions.

In Example 8, the subject matter of Examples 1-7 includes, wherein the computing device and the second computing device are transmitting and receiving in accordance with a Third Generation Partnership Project (3GPP) 5G cellular standard.

Example 9 is a computing device for wireless communication with a second computing device, the computing device comprising: a processor; a memory, storing instructions, which when executed by the processor, causes the computing device to perform operations comprising: receiving a control message with a field indicating that the second computing device is configured to decode a received signal using interference cancellation; identifying that a level of interference on a wireless channel used by the computing device and the second computing device satisfies a preset threshold condition of interference; and responsive to identifying that the level of interference of the wireless channel satisfies the preset threshold condition of interference and based upon receiving the control message with the field indicating that the second computing device is capable of interference cancellation: lowering a transmission power level of a second signal of the computing device sent to the second computing device, the transmission power level lowered from a transmission power level for sending the second signal had the level of interference of the wireless channel not satisfied the preset threshold condition of interference.

In Example 10, the subject matter of Example 9 includes, wherein the operation of identifying that the level of interference on the wireless channel used by the computing device and the second computing device satisfies the preset threshold condition of interference comprises determining that the second computing device has requested over a threshold level of retransmissions over a specified period of time.

In Example 11, the subject matter of Examples 9-10 includes, wherein the operation of identifying that the level of interference on the wireless channel satisfies the preset threshold condition of interference comprises utilizing a bit-error rate of packets received by the second computing device.

In Example 12, the subject matter of Examples 9-11 includes, wherein the operations further comprise: receiving a message commanding the computing device to lower power; and wherein the operation of lowering the transmission power level is responsive to identifying that the level of interference on the wireless channel satisfies the preset threshold condition of interference, receiving the control message with the field indicating that the receiver is capable of interference cancellation, and receiving the message commanding the receiver to lower power.

In Example 13, the subject matter of Examples 9-12 includes, wherein the operations further comprise: receiving an adjustment to the transmission power level from the second computing device; and adjusting the transmission power level as indicated by the second computing device.

In Example 14, the subject matter of Examples 9-13 includes, wherein the operations further comprise: identifying that the level of interference on the wireless channel no longer satisfies the preset threshold condition of interference and in response, adjusting the transmission power level according to a wireless standard used to transmit to the second computing device.

In Example 15, the subject matter of Examples 9-14 includes, wherein the operation of lowering the transmission power level comprises lowering the transmission power level below a transmission power specified according to a wireless standard used to transmit to the second computing device given current channel conditions.

In Example 16, the subject matter of Examples 9-15 includes, wherein the computing device, second computing device, and third computing device are transmitting and receiving in accordance with a Third Generation Partnership Project (3GPP) 5G cellular standard.

Example 17 is a computing device for communicating with a second computing device, the computing device comprising: means for receiving a control message with a field indicating that the second computing device is configured to decode a received signal using interference cancellation; means for identifying that a level of interference on a wireless channel used by the computing device and the second computing device caused by a signal of a third computing device satisfies a preset threshold condition of interference; and means for, responsive to identifying that the level of interference of the wireless channel satisfies the preset threshold condition of interference and based upon receiving the control message with the field indicating that the second computing device is capable of interference cancellation: lowering a transmission power level of a second signal of the computing device sent to the second computing device, the transmission power level lowered from a transmission power level for sending the second signal had the level of interference of the wireless channel not satisfied the preset threshold condition of interference.

In Example 18, the subject matter of Example 17 includes, wherein the means for identifying that the level of interference on the wireless channel used by the computing device and the second computing device satisfies the preset threshold condition of interference comprises means for determining that the second computing device has requested over a threshold level of retransmissions over a specified period of time.

In Example 19, the subject matter of Examples 17-18 includes, wherein the means for identifying that the level of interference on the wireless channel satisfies the preset threshold condition of interference comprises means for utilizing a bit-error rate of packets received by the second computing device.

In Example 20, the subject matter of Examples 17-19 includes, means for receiving a message commanding the computing device to lower power; and wherein lowering the transmission power level comprises lowering the transmission power level responsive to identifying that the level of interference on the wireless channel satisfies the preset threshold condition of interference, receiving the control message with the field indicating that the receiver is capable of interference cancellation, and receiving the message commanding the receiver to lower power.

In Example 21, the subject matter of Examples 17-20 includes, means for receiving an adjustment to the transmission power level from the second computing device; and means for adjusting the transmission power level as indicated by the second computing device.

In Example 22, the subject matter of Examples 17-21 includes, means for identifying that the level of interference on the wireless channel no longer satisfies the preset threshold condition of interference and in response, adjusting the transmission power level according to a wireless standard used to transmit to the second computing device.

In Example 23, the subject matter of Examples 17-22 includes, wherein the means for lowering the transmission power level comprises means for lowering the transmission power level below a transmission power specified according to a wireless standard used to transmit to the second computing device given current channel conditions.

In Example 24, the subject matter of Examples 17-23 includes, wherein the computing device and second computing device are transmitting and receiving in accordance with a Third Generation Partnership Project (3GPP) 5G cellular standard.

Example 25 is a machine-readable medium, storing instructions for wireless communication, the instructions, which when executed by a computing device, causes the computing device to perform operations comprising: receiving a control message with a field indicating that a second computing device is configured to decode a received signal using interference cancellation; identifying that a level of interference on a wireless channel used by the computing device and the second computing device satisfies a preset threshold condition of interference; and responsive to identifying that the level of interference of the wireless channel satisfies the preset threshold condition of interference and based upon receiving the control message with the field indicating that the second computing device is capable of interference cancellation: lowering a transmission power level of a second signal of the computing device sent to the second computing device, the transmission power level lowered from a transmission power level for sending the second signal had the level of interference of the wireless channel not satisfied the preset threshold condition of interference.

In Example 26, the subject matter of Example 25 includes, wherein the operation of identifying that the level of interference on the wireless channel used by the computing device and the second computing device satisfies the preset threshold condition of interference comprises determining that the second computing device has requested over a threshold level of retransmissions over a specified period of time.

In Example 27, the subject matter of Examples 25-26 includes, wherein the operation of identifying that the level of interference on the wireless channel satisfies the preset threshold condition of interference comprises utilizing a bit-error rate of packets received by the second computing device.

In Example 28, the subject matter of Examples 25-27 includes, wherein the operations further comprise: receiving a message commanding the computing device to lower power; and wherein the operation of lowering the transmission power level is responsive to identifying that the level of interference on the wireless channel satisfies the preset threshold condition of interference, receiving the control message with the field indicating that the receiver is capable of interference cancellation, and receiving the message commanding the receiver to lower power.

In Example 29, the subject matter of Examples 25-28 includes, wherein the operations further comprise: receiving an adjustment to the transmission power level from the second computing device; and adjusting the transmission power level as indicated by the second computing device.

In Example 30, the subject matter of Examples 25-29 includes, wherein the operations further comprise: identifying that the level of interference on the wireless channel no longer satisfies the preset threshold condition of interference and in response, adjusting the transmission power level according to a wireless standard used to transmit to the second computing device.

In Example 31, the subject matter of Examples 25-30 includes, wherein the operations of lowering the transmission power level comprises lowering the transmission power level below a transmission power specified according to a wireless standard used to transmit to the second computing device given current channel conditions.

In Example 32, the subject matter of Examples 25-31 includes, wherein the computing device, second computing device, and third computing device are transmitting and receiving in accordance with a Third Generation Partnership Project (3GPP) 5G cellular standard.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

What is claimed is:

1. A method for wireless communication between a computing device and a second computing device, the method comprising:
    at the computing device:
        receiving a control message with a field indicating that the second computing device is configured to decode a received signal using interference cancellation;
        identifying that a level of interference on a wireless channel used by the computing device and the second computing device satisfies a preset threshold condition of interference; and
        responsive to identifying that the level of interference of the wireless channel satisfies the preset threshold condition of interference and based upon receiving the control message with the field indicating that the second computing device is capable of interference cancellation:
            lowering a transmission power level of a second signal of the computing device sent to the second computing device, the transmission power level lowered from a transmission power level for sending the second signal had the level of interference of the wireless channel not satisfied the preset threshold condition of interference.

2. The method of claim 1, further comprising: at the second computing device: performing successive interference cancellation to subtract out a third signal of a third computing device prior to decoding the second signal.

3. The method of claim 1, wherein identifying that the level of interference on the wireless channel satisfies the preset threshold condition of interference comprises utilizing a bit-error rate of packets received by the second computing device.

4. The method of claim 1, further comprising:
    receiving a message commanding the computing device to lower power; and
    wherein lowering the transmission power level is responsive to identifying that the level of interference on the wireless channel satisfies the preset threshold condition of interference, receiving the control message with the field indicating that the receiver is capable of interference cancellation, and receiving the message commanding the receiver to lower power.

5. The method of claim 1, further comprising:
    receiving an adjustment to the transmission power level from the second computing device; and
    adjusting the transmission power level as indicated by the second computing device.

6. The method of claim 1, further comprising:
    identifying that the level of interference on the wireless channel no longer satisfies the preset threshold condition of interference and in response, adjusting the transmission power level according to a wireless standard used to transmit to the second computing device.

7. The method of claim 1, wherein lowering the transmission power level comprises lowering the transmission power level below a transmission power specified according to a wireless standard used to transmit to the second computing device for current channel conditions.

8. The method of claim 1, wherein the computing device and the second computing device are transmitting and receiving in accordance with a Third Generation Partnership Project (3GPP) 5G cellular standard.

9. A computing device for wireless communication with a second computing device, the computing device comprising:
    a processor;
    a memory, storing instructions, which when executed by the processor, causes the computing device to perform operations comprising:
        receiving a control message with a field indicating that the second computing device is configured to decode a received signal using interference cancellation;
        identifying that a level of interference on a wireless channel used by the computing device and the second computing device satisfies a preset threshold condition of interference; and
        responsive to identifying that the level of interference of the wireless channel satisfies the preset threshold condition of interference and based upon receiving the control message with the field indicating that the second computing device is capable of interference cancellation:
            lowering a transmission power level of a second signal of the computing device sent to the second computing device, the transmission power level lowered from a transmission power level for sending the second signal had the level of interference of the wireless channel not satisfied the preset threshold condition of interference.

10. The computing device of claim 9, wherein the operation of identifying that the level of interference on the wireless channel used by the computing device and the second computing device satisfies the preset threshold condition of interference comprises determining that the second computing device has requested over a threshold level of retransmissions over a specified period of time.

11. The computing device of claim 9, wherein the operation of identifying that the level of interference on the wireless channel satisfies the preset threshold condition of interference comprises utilizing a bit-error rate of packets received by the second computing device.

12. The computing device of claim 9, wherein the operations further comprise:
    receiving a message commanding the computing device to lower power; and
    wherein the operation of lowering the transmission power level is responsive to identifying that the level of interference on the wireless channel satisfies the preset threshold condition of interference, receiving the control message with the field indicating that the receiver is capable of interference cancellation, and receiving the message commanding the receiver to lower power.

13. The computing device of claim 9, wherein the operations further comprise:
    receiving an adjustment to the transmission power level from the second computing device; and
    adjusting the transmission power level as indicated by the second computing device.

14. The computing device of claim 9, wherein the operations further comprise:
    identifying that the level of interference on the wireless channel no longer satisfies the preset threshold condition of interference and in response, adjusting the transmission power level according to a wireless standard used to transmit to the second computing device.

15. The computing device of claim 9, wherein the operation of lowering the transmission power level comprises lowering the transmission power level below a transmission power specified according to a wireless standard used to transmit to the second computing device given current channel conditions.

16. The computing device of claim 9, wherein the computing device, second computing device, and third computing device are transmitting and receiving in accordance with a Third Generation Partnership Project (3GPP) 5G cellular standard.

17. A computing device for communicating with a second computing device, the computing; device comprising:
- means for receiving a control message with a field indicating that the second computing device is configured to decode a received signal using interference cancellation;
- means for identifying that a level of interference on a wireless channel used by the computing device and the second computing device caused by a signal of a third computing device satisfies a preset threshold condition of interference; and
- means for, responsive to identifying that the level of interference of the wireless channel satisfies the preset threshold condition of interference and based upon receiving the control message with the field indicating that the second computing device is capable of interference cancellation:
  - lowering a transmission power level of a second signal of the computing device sent to the second computing device, the transmission power level lowered from a transmission power level for sending the second signal had the level of interference of the wireless channel not satisfied the preset threshold condition of interference.

18. The computing device of claim 17, wherein the means for identifying that the level of interference on the wireless channel used by the computing device and the second computing device satisfies the preset threshold condition of interference comprises means for determining that the second computing device has requested over a threshold level of retransmissions over a specified period of time.

19. The computing device of claim 17, wherein the means for identifying that the level of interference on the wireless channel satisfies the preset threshold condition of interference comprises means for utilizing a bit-error rate of packets received by the second computing device.

20. The computing device of claim 17, further comprising:
- means for receiving a message commanding the computing device to lower power; and
- wherein lowering the transmission power level comprises lowering the transmission power level responsive to identifying that the level of interference on the wireless channel satisfies the preset threshold condition of interference, receiving the control message with the field indicating that the receiver is capable of interference cancellation, and receiving the message commanding the receiver to lower power.

* * * * *